J., W. H. & E. R. WILLIAMS.
DISINFECTOR OR DEODORIZER.
APPLICATION FILED JULY 13, 1909.
963,492.
Patented July 5, 1910.
3 SHEETS—SHEET 2.
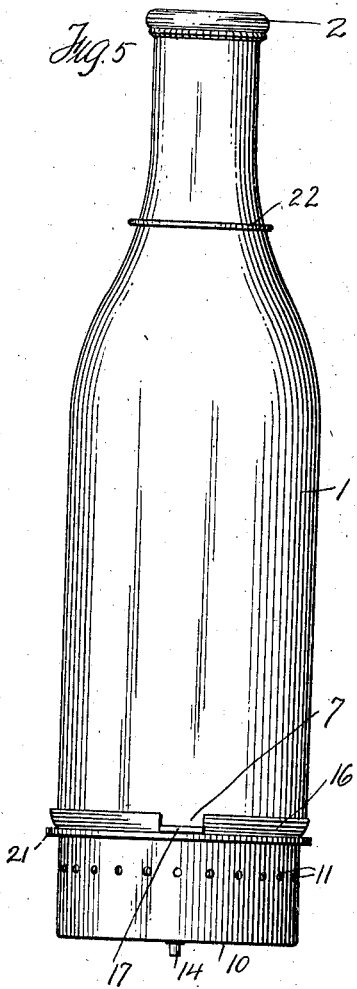
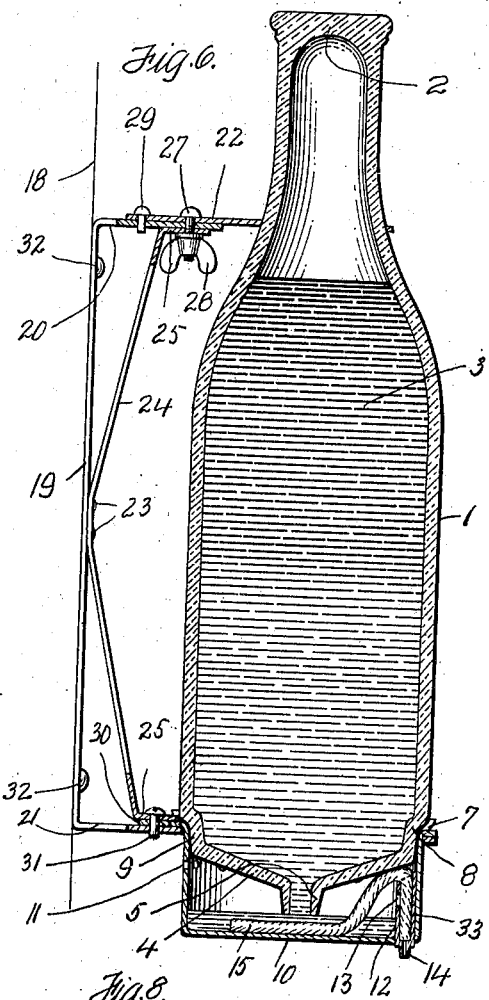
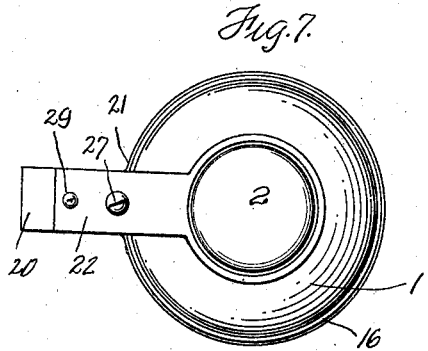
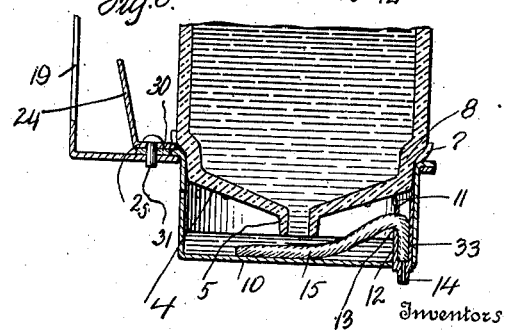
Witnesses
Samuel Payne
N. Louis Bogan
Inventors
J. Williams
W. H. Williams
E. R. Williams
By
H. C. Everd & Co.
Attorneys
THE NORRIS PETERS CO., WASHINGTON, D. C.

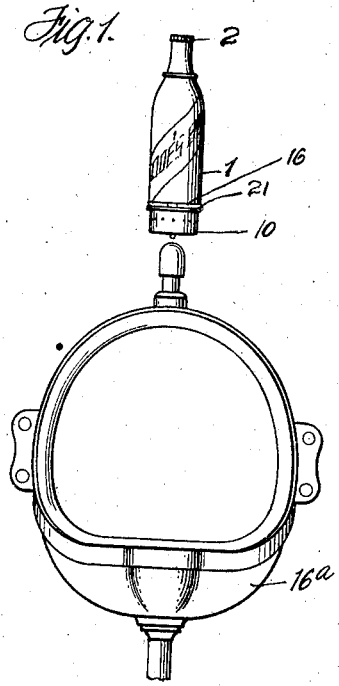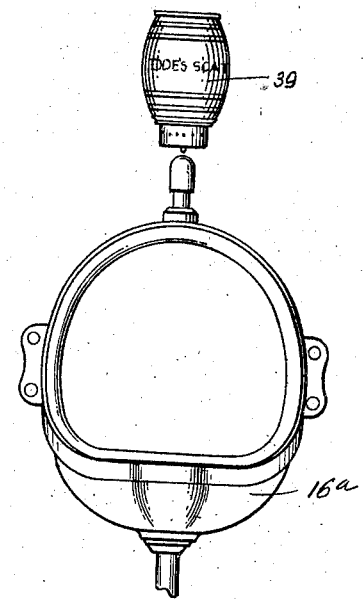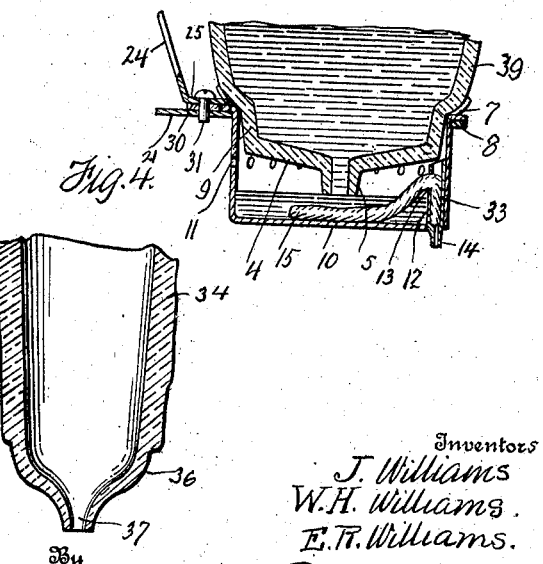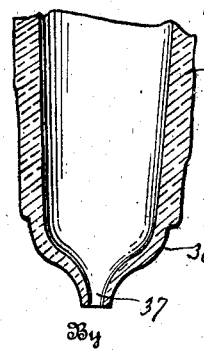

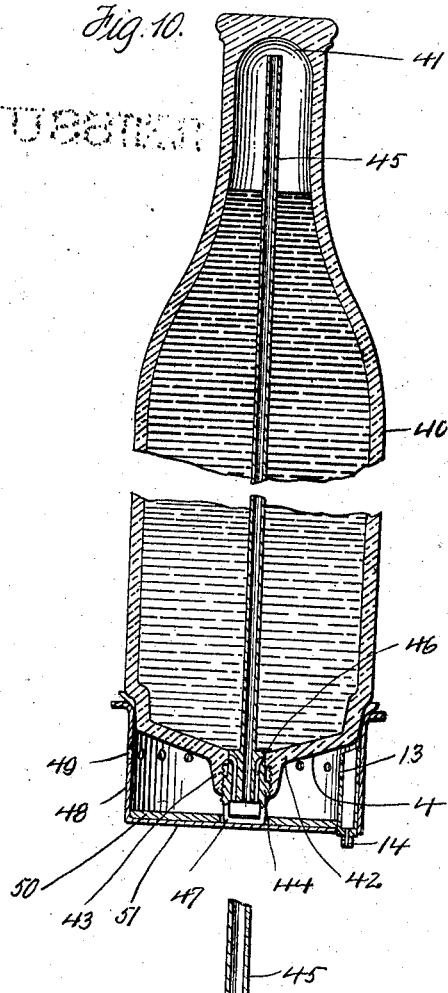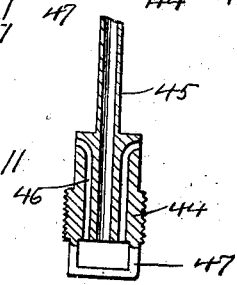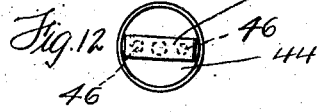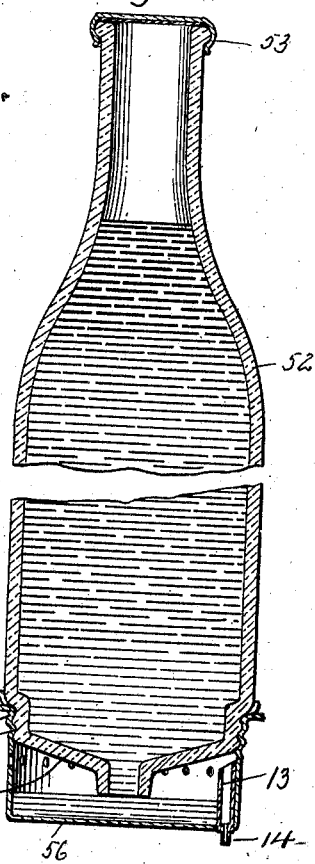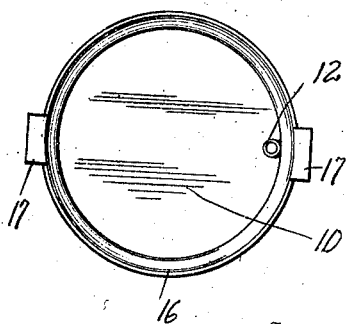

UNITED STATES PATENT OFFICE.

JOSEPH WILLIAMS, WILLIAM H. WILLIAMS, AND EDWARD R. WILLIAMS, OF SHARPSBURG, PENNSYLVANIA.

DISINFECTOR OR DEODORIZER.

963,492.

Specification of Letters Patent. Patented July 5, 1910.

Application filed July 13, 1909. Serial No. 507,342. REISSUED

*To all whom it may concern:*

Be it known that we, JOSEPH WILLIAMS, WILLIAM H. WILLIAMS, and EDWARD R. WILLIAMS, citizens of the United States of America, residing at Sharpsburg, in the county of Allegheny and State of Pennsylvania, have invented certain new and useful Improvements in Disinfectors or Deodorizers, of which the following is a specification, reference being had therein to the accompanying drawing.

This invention relates to disinfectors and deodorizers and has for one of its objects to provide a receptacle containing the disinfectant or deodorant of a shape similar to an article of commerce or of a contour similar to a bottle, jar, keg or receptacle containing an article of commerce whereby the disinfectant or deodorant receptacle will constitute an advertising medium.

A further object of the invention is to provide a deodorizer or disinfector with means as hereinafter set forth, to allow for the rapid escape by evaporation of the deodorant or disinfectant, or the convenient discharge in drops to the place or object desired to be deodorized or disinfected.

Further objects of the invention are to provide in a manner as hereinafter set forth a deodorizer or disinfector which shall be simple of construction, strong, durable, efficient in use, conveniently supported in its operative position, constituting an advertising medium and inexpensive to manufacture.

With the foregoing and other objects in view, the invention consists in the novel construction, combination and arrangement of parts as hereinafter more specifically described and illustrated in the accompanying drawings wherein is shown the preferred embodiment of the invention, but it is to be understood that changes, variations, and modifications can be resorted to which fall within the scope of the claims hereunto appended.

In the drawings: Figure 1 is a front elevation of one form of the deodorant or disinfectant receptacle in accordance with this invention showing the adaptation therewith in connection with a urinal, Fig. 2 is a front elevation of another form of deodorant or disinfectant receptacle in accordance with this invention, showing the adaptation therewith in connection with a urinal, Fig. 3 is a front elevation of another form of receptacle, Fig. 4 is a vertical sectional view broken away of the form shown in Fig. 3, Fig. 5 is an enlarged elevation of the form of receptacle shown in Fig. 1, Fig. 6 is a vertical sectional view of the form of receptacle shown in Fig. 5 and furthermore showing the supporting device for the receptacle, Fig. 7 is a top plan view of the receptacle shown in Fig. 6, Fig. 8 is a sectional detail of a receptacle similar to that in Fig. 6 with a different arrangement of wick for capillary attraction for discharging the disinfectant, Fig. 9 is a sectional detail of the bottom of the form of receptacle shown in Fig. 2, Fig. 10 is a vertical sectional view of another form of receptacle, Fig. 11 is a sectional view of a portion of plug feeding valve, Fig. 13 is a vertical secvent tube, Fig. 12 is an inverted plan of the plug feeding valve, Fig. 13 is a vertical sectional view of another form of receptacle, and Fig. 14 is a bottom plan of the pan.

In connection with the various receptacles disclosed, it will be stated that when it is desired to disinfect or deodorize the atmosphere by means of the process of evaporation, the wick for capillary attraction can be dispensed with, but when it is desired to deodorize or disinfect a desired place or object, also the air, the wick is employed.

In the general form of deodorizers or disinfectors now in use, the receptacle containing the disinfectant or deodorant is supported within an outer casing, the latter being secured to a suitable support, but in accordance with this invention the outer casing is dispensed with and the receptacle containing the disinfectant or deodorant is connected directly to a support.

As before stated, one of the objects of the invention was to set up a disinfector or deodorizer which would constitute an advertising medium, and in this connection it will be stated that if the disinfector or deodorizer is used for advertising purposes and if the article desired to be advertised is a cigar, the receptacle containing the deodorant or disinfectant would be in the shape of a cigar with suitable advertising matter thereon, or the name of the advertiser, or the name of the cigar, as will be noted by reference to Fig. 3. If the disinfector or deodorizer were used to advertise the products of a brewing company, the receptacle containing the deodorant or disinfectant would be in the shape of a bottle of beer or other liquid, or it may be in the shape of a keg, as clearly shown in Figs. 1 and 2, the bottle carrying suitable advertising matter of the brand of the beer and the keg provided likewise. This idea could be carried out so that the receptacle containing the deodorant or disinfectant would be of a contour similar to the article vended by the parties using the disinfector or deodorizer for advertising purposes or the shape of the receptacle containing the deodorant or disinfectant would be of a contour corresponding to the receptacle containing the article vended.

Referring to Figs. 1–5 and 6 of the drawings, 1 denotes a deodorant or disinfectant receptacle of a contour similar to that of a bottle and which is closed at its upper end as at 2, the deodorant or disinfectant being indicated by the reference character 3. The bottom of the receptacle 1 is indicated by the reference character 4, and is concavo-convex in section, and approximately central thereof is provided with a depending outlet 5. The side of the receptacle 1 near its lower end is bent inwardly at an angle as at 7 to provide a seat 8 within the plane of the body portion of the receptacle. The said inwardly extending portion 7 terminates in an inclined portion 9, which merges into the bottom 4. Arranged at the lower end of the receptacle 1 and surrounding the bottom 4, as well as engaging the seat 8 is a receiving pan 10 provided with a circumferentially extending series of openings 11 and furthermore provided with an inwardly arranged tube 12 having an opening as at 13 and which terminates in a discharge nipple 14 depending from the bottom of the pan 10. Within the pan 10 is arranged a wick 15 which extends into the tube 12 and is utilized for conveying the disinfectant by capillary attraction to the lower portion of the tube 12 so that the disinfectant can be discharged through the nipple 14 and drip into a urinal 16ᵃ, as shown in Fig. 1. The side of the pan 10 is of such height as to project above the seat 8 as clearly shown in Fig. 5 and indicated by the reference character 16. The portion 16 of the pan being of larger diameter than that part of the pan below the portion 16. The portion 16 is fitted to provide a plurality of fastening lugs 17 for a purpose to be presently referred to.

The deodorant or disinfectant receptacle is suspended from a support 18 which may be one of the walls of a room or suitable frame work arranged in connection with a urinal, or any suitable support. The receptacle is suspended through the medium of a hanger consisting of a body portion 19 formed of an elongated strip of suitable material having the upper and lower ends thereof 20 and 21 bent at right angles with respect to the body portion 19. The end 20 has connected thereto a retaining arm 22 formed with an opening through which extends the neck of the bottle, as clearly shown in Fig. 6. Connected to the body portion 19, as at 23, is a brace member 24 having angular ends 25 extending in parallelism with respect to the angular ends 20 and 21. The arm 22 is coupled to the angular end 20 by screw bolt 27 provided with a wing nut 28, the bolt extending through the arm 22, angular end 20 and angular end 25. To prevent twisting of the arm 22, it is connected by the holdfast device 29 to the angular end 20. Mounted upon the angular end 21 is a washer 30 upon which extends the lower angular end 25 of the brace 24. The angular end 21 is of greater length than the end 20 and is provided with an opening through which extends the pan 10, as clearly shown in Fig. 6. The position of the angular end 21 with respect to the pan 10 is below the portion 16 of the pan so that the clips or tongues 17 can be bent over and upon the angular end 21 whereby said end 21 supports the lower portion of the receptacle. One of the clips 17 is secured between the angular end 25 and the angular end 21 and maintained in said position through the medium of a holdfast device 31 which extends through the angular end 25, washer 30, and angular end 21. It is through the medium of the angular end 25 extending into the recess formed by bending down the clip 17 that the pan 10 is held in position, either with the drip tube 14 at the front or at the back of the disinfector or deodorizer, as may be desired. The body portion 19 of the hanger is secured to the support 18 by a suitable holdfast device 32.

The opening 13 in the tube 12, as shown in Fig. 6, allows of the use of suitable tools for positioning the end 33 of the wick 15 in the tube 12, or if desired as shown in Fig. 8, the wick 15 may extend through the opening 13 into the tube 12. With the exception of the different arrangement of the wick in Fig. 8, the construction is the same as that shown in Fig. 6, the same reference characters being applied thereto.

Referring to Figs. 3 and 4 of the drawings, the receptacle which is indicated by the reference character 34 is of a shape similar to that of a cigar and is closed at its upper end as at 35. The lower end of the receptacle is contracted as at 36 to provide a tapering outlet, as at 37. To the lower end of the receptacle 34, a pan similar to that disclosed in connection with Figs. 6 and 8 is attached, as indicated by the reference character 38. The receptacle 34 is suspended in the same manner as the receptacle 1.

Referring to Fig. 9 which denotes the lower portion of the receptacle 39 shown in Fig. 2, the said lower portion is of a construction similar to the lower portion of the receptacle shown in Fig. 6, the same reference characters being applied thereto. The construction of pan and arrangement of wick is similar to that as shown in Fig. 8, like reference characters being applied thereto.

Referring to Fig. 10, the receptacle is in the form of a bottle and is indicated by the reference character 40, the upper end of the receptacle is closed as at 41, the bottom of the receptacle is indicated by the reference character 42 and is provided with a centrally disposed outlet 43 having interior threads to which is attached a valve feeding plug 44, which is provided with a vent tube 45 extending upwardly into the receptacle 44 and is further provided with a pair of outlet passages 46 and also has a depending yoke 47. The reference character 48 denotes a pan having a circumferentially extending series of openings 49, and further having a plate 50 mounted upon the bottom thereof, the said plate being provided with a centrally disposed opening into which extends the yoke 47 so that the said yoke can engage the bottom 51 of the pan. The pan 48 is secured to the receptacle 40 in the same manner as the pan 10 and otherwise than that as stated, the construction of the pan 48 is similar to the pan 10. The valve plug 44 is in position to shut off the discharge of the deodorant or disinfectant, and if it be desired to discharge the deodorant or disinfectant, the receptacle is turned upon the pan 48, the walls of the opening in the plate 50 engaging the yoke 47, turning the plug 44 and shifting the plug to a position, whereby the passages 46 will open into the receptacle 40 so that a discharge of the deodorant or disinfectant will be had.

Referring to Fig. 13 of the drawings, the receptacle is indicated by the reference character 52, and with a contour similar to that of a bottle and has its mouth closed through the medium of what is known as "crown seal". The bottom of the receptacle 52 is similar to that as disclosed in connection with Fig. 10, but the side of the receptacle at its lower end is threaded as at 54 with which engages the threads 55 on the pan 56, otherwise than as stated the construction is the same as shown in Fig. 1. In lieu of the crown seal any ordinary and well known form of closure can be used, as an ordinary cork, and through the medium of this detachable closure the bottle can be filled. An advantage gained in connection with the detachable pan is that of rotating the pan until the discharge tube thereof is at the rear side of the disinfector, thus permitting of a tube being attached to the discharge nipple of the pan to convey the disinfectant to a bowl or hopper of a closet.

By reference to Figs. 9, 6, 8 and 13, it will be observed that the opening in the bottom of the receptacle is sealed by the fluid contained within the pan, and we desire to call attention again to the tube arranged within the pan and a wick extending from the tube. The discharge of the disinfectant can be regulated according to the position of the wick. It is apparent that if the wick extends over the upper end of the tube, instead of through the opening in the side of the tube, that the capillary attraction requires a greater period of time, since the disinfectant has a much greater distance to travel.

What we claim is:

1. A device for the purpose set forth comprising a receptacle adapted to hold a disinfectant liquid having the lower portion thereof contracted and its bottom formed with an outlet, said contracted portion tapering, a pan inclosing the periphery of said contracted portion of and engaging at the top and depending below the bottom of the contracted portion, said pan provided with a circumferentially extending series of openings at a point above the outlet of said contracted lower portion of the receptacle, and a tube arranged within and supported by the bottom of the pan and having a discharge nipple projecting exteriorly of the bottom of the pan.

2. A device for the purpose set forth comprising a receptacle adapted to hold a disinfectant liquid having the lower portion thereof contracted and its bottom formed with an outlet, said contracted portion tapering, a pan inclosing the periphery of said contracted portion of and engaging at the top and depending below the bottom of the contracted portion, said pan provided with a circumferentially extending series of openings at a point above the outlet of said contracted lower portion of the receptacle, a tube arranged within and supported by the bottom of the pan and having a discharge nipple projecting exteriorly of the bottom of the pan, and a wick mounted upon the bottom of the pan and having one end extending in said tube.

3. A device for the purpose described comprising a receptacle adapted to hold a disinfectant liquid having the lower portion thereof contracted and its bottom formed with an outlet, said contracted portion tapering, a pan inclosing the periphery of said contracted portion of and engaging at the top and depending below the bottom of the contracted portion, said pan provided with a circumferentially extending series of openings at a point above the outlet of said contracted lower portion of the receptacle, a tube arranged within and supported by the bottom of the pan and having a discharge nipple projecting exteriorly of the bottom of the pan, and means engaging with said receptacle and with said pan for suspending them from a support.

4. A device for the purpose set forth comprising a receptacle adapted to hold a disinfectant liquid having its lower portion contracted and further having said contracted lower portion provided with a bottom substantially concavo-convex in cross-section, said bottom having a depending outlet, said contracted portion tapering, a pan surrounding the contracted portion of said receptacle and depending below the terminus of the outlet, and a tube supported by the bottom of said pan and communicating with the interior of the pan and provided with a discharge nipple projecting exteriorly of the bottom of the pan.

5. A device for the purpose set forth comprising a receptacle constituting in itself a reservoir and having the lower portion thereof contracted and its bottom formed with an outlet, said contracted portion tapering, a pan engaging the top of the periphery of the contracted portion of said receptacle and depending below the bottom thereof, said pan provided with a circumferentially extending series of openings at a point above the outlet of said contracted lower portion of the receptacle, and a tube arranged within and supported by the bottom of the pan and having a discharge nipple projecting exteriorly of the bottom of the pan.

6. A device for the purpose set forth comprising a receptacle constituting in itself a reservoir and having the lower portion thereof contracted and its bottom formed with an outlet, said contracted portion tapering, a pan engaging the top of the periphery of the contracted portion of said receptacle and depending below the bottom thereof, said pan provided with a circumferentially extending series of openings at a point above the outlet of said contracted lower portion of the receptacle, a tube arranged within and supported by the bottom of the pan and having a discharge nipple projecting exteriorly of the bottom of the pan, and a wick mounted upon the bottom of the pan and having one end extending in said tube.

7. A device for the purpose set forth comprising a receptacle constituting in itself a reservoir and having the lower portion thereof contracted and its bottom formed with an outlet, said contracted portion tapering, a pan engaging the top of the periphery of the contracted portion of said receptacle and depending below the bottom thereof, said pan provided with a circumferentially extending series of openings at a point above the outlet of said contracted lower portion of the receptacle, a tube arranged within and supported by the bottom of the pan and having a discharge nipple projecting exteriorly of the bottom of the pan, and means engaging directly with said receptacle and with said pan for suspending them from a suitable support.

8. A device for the purpose set forth comprising a receptacle constituting in itself a reservoir and having the lower portion thereof contracted and its bottom formed with an outlet, said contracted portion tapering, a pan engaging the upper part of the contracted portion of said receptacle and depending below the bottom thereof, said pan provided with a circumferentially extending series of openings at a point above the outlet of said contracted lower portion of the receptacle, a tube arranged within and supported by the bottom of the pan and having a discharge nipple projecting exteriorly of the bottom of the pan, a wick mounted upon the bottom of the pan and having one end extending in said tube, and means engaging directly with said receptacle and with said pan for suspending them from a suitable support.

9. In a device for the purpose set forth, a receptacle constituting in itself a reservoir and having a contracted lower portion terminating in a bottom substantially concavo-convex in cross-section, said bottom provided with a depending outlet, and said contracted portion tapering, a pan arranged at the contracted lower portion of said receptacle and adapted to receive the contents of the receptacle, said pan having an outlet for discharging said contents and further having a series of openings.

10. A device for the purpose set forth comprising a receptacle constituting in itself a reservoir and having a closed upper end and a contracted lower portion terminating in a bottom substantially concavo-convex in cross-section, said bottom having an outlet, and said contracted portion tapering, a pan arranged to inclose said contracted lower portion and adapted to receive the contents of said receptacle, said pan having an outlet and further having openings.

11. A device for the purpose set forth comprising a receptacle constituting in itself a reservoir and having the lower portion thereof contracted and its bottom formed with an outlet, a pan engaging the upper part of the contracted portion of said receptacle and depending below the bottom thereof, said pan provided with a circumferentially-extending series of openings at a point above the outlet of said contracted lower portion of the receptacle, a tube arranged within and supported by the bottom of the pan and having a discharge nipple projecting exteriorly of the bottom of the pan, a wick mounted upon the bottom of the pan and having one end extending in said tube, means engaging with the upper portion of said receptacle and with said pan for suspending them from a suitable support.

In testimony whereof we affix our signatures in the presence of two witnesses.

JOSEPH WILLIAMS.
WILLIAM H. WILLIAMS.
EDWARD R. WILLIAMS.

Witnesses:
E. L. STEWART,
EDWARD A. GRUNENWALD.